US011379500B2

United States Patent
Bhargava et al.

(10) Patent No.: US 11,379,500 B2
(45) Date of Patent: Jul. 5, 2022

(54) AUTOMATED DATA INTEGRATION, RECONCILIATION, AND SELF HEALING USING MACHINE LEARNING

(71) Applicant: SAP SE, Walldorf (DE)

(72) Inventors: Apoorv Bhargava, Bangalore (IN); Daniel Zimmermann, Wiesloch (DE); Markus Goeppert, Walldorf (DE); Syed Aleemuddin Noor, Bangalore (IN); Gowthami Agumamidi, Bangalore (IN)

(73) Assignee: SAP SE, Walldorf (DE)

( * ) Notice: Subject to any disclaimer, the term of this patent is extended or adjusted under 35 U.S.C. 154(b) by 212 days.

(21) Appl. No.: 16/879,262

(22) Filed: May 20, 2020

(65) Prior Publication Data
US 2021/0303547 A1 Sep. 30, 2021

(30) Foreign Application Priority Data
Mar. 30, 2020 (IN) .............................. 202011013802

(51) Int. Cl.
*G06F 16/27* (2019.01)
*G06F 16/23* (2019.01)
*G06N 20/00* (2019.01)

(52) U.S. Cl.
CPC ........ *G06F 16/273* (2019.01); *G06F 16/2365* (2019.01); *G06N 20/00* (2019.01)

(58) Field of Classification Search
None
See application file for complete search history.

(56) References Cited

U.S. PATENT DOCUMENTS

| 10,324,947 B2 * | 6/2019 | Dey ...................... G06F 16/258 |
| 10,437,855 B1 * | 10/2019 | Stronge ............... G06F 11/2082 |
| 2015/0046389 A1 * | 2/2015 | Dhayapule ............ G06F 16/245 |
| | | 707/602 |
| 2020/0134483 A1 * | 4/2020 | Bremer ................. G06F 16/215 |
| 2021/0281655 A1 * | 9/2021 | Ogrinz .................... H04L 67/10 |

* cited by examiner

*Primary Examiner* — Scott A. Waldron
(74) *Attorney, Agent, or Firm* — Klarquist Sparkman, LLP (57) ABSTRACT

Technologies are described for performing automated data integration, reconciliation, and/or self-healing using machine learning. For example, data integration can be checked using a reconciliation procedure. The number of times that the reconciliation is performed can be determined dynamically by a machine learning model. For each iteration, reconciliation can be performed to check integrated data against source data. If any reconciliation errors are found, then self-healing operations can be performed. Results of the reconciliation can be output. The reconciliation results can be used to update the machine learning model so that the machine learning model can dynamically adjust the number of iterations to perform based at least in part on reconciliation results.

14 Claims, 5 Drawing Sheets

AUTOMATED DATA INTEGRATION, RECONCILIATION, AND SELF HEALING USING MACHINE LEARNING

BACKGROUND

Traditionally, it is a common requirement that one system integrates and replicates the data of another system in order to perform additional processing. For example, the one system may need the data from the other system to generate reports or to perform other data processing tasks. Generally, it is expected that data integration technologies ensure that the data is correctly integrated and replicated. If data is not correctly integrated and replicated, then errors can result. For example, if data is missing from the integration and replication, then reports may contain incorrect or incomplete results.

In some solutions, manual data reconciliation is performed. For example, a user can manually reconcile data by comparing integrated data from the one system with the data from the other system. While manual reconciliation can help identify and correct reconciliation problems, it is an inefficient and error prone process.

In some solutions, an automated static reconciliation process is performed. While an automated static reconciliation process can be more accurate than a manual reconciliation process, it still suffers from a number of drawbacks. For example, a static process may still be inefficient in some situations (e.g., it may perform additional unnecessary checks) and it may not catch all integration errors (e.g., it may be configured to perform a specific type of test, which does not catch some integration errors).

Therefore, there exists ample opportunity for improvements in data integration and reconciliation technologies.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Various technologies are described herein for performing automated data integration, reconciliation, and/or self-healing using machine learning. For example, data integration can be checked using a reconciliation procedure. The number of times that the reconciliation is performed can be determined dynamically by a machine learning model. For each iteration, reconciliation can be performed to check integrated data against source data. If any reconciliation errors are found, then self-healing operations can be performed. Results of the reconciliation can be output. The reconciliation results can be used to update the machine learning model so that the machine learning model can dynamically adjust the number of iterations to perform based at least in part on reconciliation results.

For example, an automated process for data reconciliation and self-healing using machine learning can comprise receiving an indication of a number of reconciliation iterations to perform. For each reconciliation iteration, the automated process can comprise performing reconciliation that comprises checking consistency of integrated data in a target system against source data in a source system and, when a reconciliation error is found, performing self-healing to correct the integrated data in the target system. The automated process can also comprise outputting reconciliation results from performing the reconciliations over the number of reconciliation iterations. The number of reconciliation iterations can be generated by a machine learning model. The machine learning model can dynamically generate the number of reconciliation iterations based on prior reconciliation results.

DETAILED DESCRIPTION

Overview

The following description is directed to technologies for performing automated data integration, reconciliation, and/or self-healing using machine learning. For example, data integration can be checked using a reconciliation procedure. The number of times that the reconciliation is performed (i.e., the number of iterations) is determined dynamically by a machine learning model. For each iteration, reconciliation can be performed to check integrated data (e.g., in a target system) against source data (e.g., in a source system). If any reconciliation errors are found, then self-healing operations can be performed. Results of the reconciliation can be output (e.g., saved in a data store, reported to an administrator, or output in another manner). The reconciliation results can be used to update (e.g., re-train) the machine learning model. In this way, the machine learning model can dynamically adjust the number of iterations to perform based at least in part on reconciliation results (e.g., how many iterations were needed in the past to ensure that data is fully and correctly integrated).

For example, performing automated data reconciliation and self-healing can comprise receiving an indication of a number of iterations (also referred to as reconciliation iterations) to perform, where the number of iterations is generated by a machine learning model. During each iteration, reconciliation is performed to check the consistency of integrated data against source data. For example, the reconciliation can determine whether all of the source data has been integrated (e.g., checking that all database records in the source data have been integrated into the integrated data). If a reconciliation errors is found during an iteration (e.g., if there are missing database records), then self-healing is performed. For example, self-healing can comprise integrating the missing data (e.g., copying a missing database record from the source data to the integrated data, which can include data transformations and other data manipulation operations). The results of the reconciliation can be used to modify (e.g., re-train) the machine learning model. For example, the machine learning model can dynamically adjust the number of iterations for future reconciliations based at least in part on the results.

The automated technologies described herein can fully automate process of data integration, reconciliation, and/or self-healing. For example, the technologies can be used to automatically generate a number of iterations of reconciliation to perform (e.g., automatically generated by a machine learning model). The technologies can be used to automatically receive an indication of the number of iterations and automatically perform each iteration (e.g., comprising performing reconciliation and/or self-healing). The technologies can be used to automatically output reconciliation results (e.g., provide results for use by the machine learning model to automatically re-train the model).

The technologies described herein provide advantages over typical solutions (e.g., solutions involving manual reconciliation or automated static reconciliation). For example, the automated data integration, reconciliation, and/or self-healing technologies described herein can provide a more efficient and accurate solution. Improvements in efficiency can be realized by dynamically adjusting the number of iterations to perform using a machine learning model. For example, the machine learning model can predict the number of iterations that will be needed (e.g., as a recommended number of iterations) to ensure consistency of the integrated data without the need for additional unnecessary iterations. Improvements in accuracy can also be realized. For example, the machine learning model can predict how many iterations will be needed to catch all reconciliation errors.

Data Integration

In the technologies described herein, data integration is performed to integrate data between different systems. In general, data integration is performed between two (or more) systems which each maintain their own data (e.g., each system maintains, or is associated with, its own database or data store). The different systems could be managed by the same entity (e.g., by the same business or organization) or by different entities.

Even though the systems are different (e.g., they are decoupled systems) there is a need for the systems to share data. For example, data integration can occur when a first system (or systems) sends data (e.g., database records, fields, or other types of data) to a second system. Data integration can also comprise data transformation operations. For example, when data is provided from a first system to a second system, data transformation can be performed so that the data can be integrated at the second system. Data transformation can involve reformatting and/or restructuring data so that it can be used by the second system.

For example, the systems may be involved with an end-to-end process (e.g., an end-to-end business process). For example, a first system (also referred to as the source system in this example) could be an order system that takes customer orders and a second system (also referred to as the target system in this example) could be an invoicing system that generates invoices for the orders. In this example, the source system can provide data (e.g., order data, which could include names, addresses, products, quantities, prices, etc.) to the target system. The data provided to the target system needs to be integrated at the target system. For example, certain database fields could be extracted from the source system data store, transformed (e.g., reformatted, restructured, modified, etc.), and stored at the target system data store.

As another example, data integration can be performed between an enterprise resource planning (ERP) system and an excise tax system. In this example, the ERP system provides logistics data (e.g., data related to material movement from warehouses to other warehouses or customers) to an excise tax system (e.g., running in a cloud computing environment). The excise tax system integrates the received logistics data and uses the integrated data for various purposes (e.g., calculating excise tax, reporting, auditing, etc.).

In some implementations, the systems are remote from one another. For example, the source system could be located in a first network environment and the target system could be located in a second, different, network environment (e.g., in a remote cloud computing environment).

Environment for Automated Data Integration, Reconciliation, and Self-Healing

Using the technologies described herein, environments can be provided for performing automated data integration, reconciliation, and/or self-healing. The environments can comprise various types of computing resources. For example, a source system can comprise various software and/or hardware resources for storing data (e.g., in a database or another type of data store) and for providing stored data to other systems (e.g., as part of an integration, reconciliation, and/or self-healing process). A target system can comprise various software and/or hardware resources for performing data integration, reconciliation, self-healing, and machine learning modeling, and for storing integrated data and reconciliation results (e.g., in a database or another type of data store).

Figure 1:
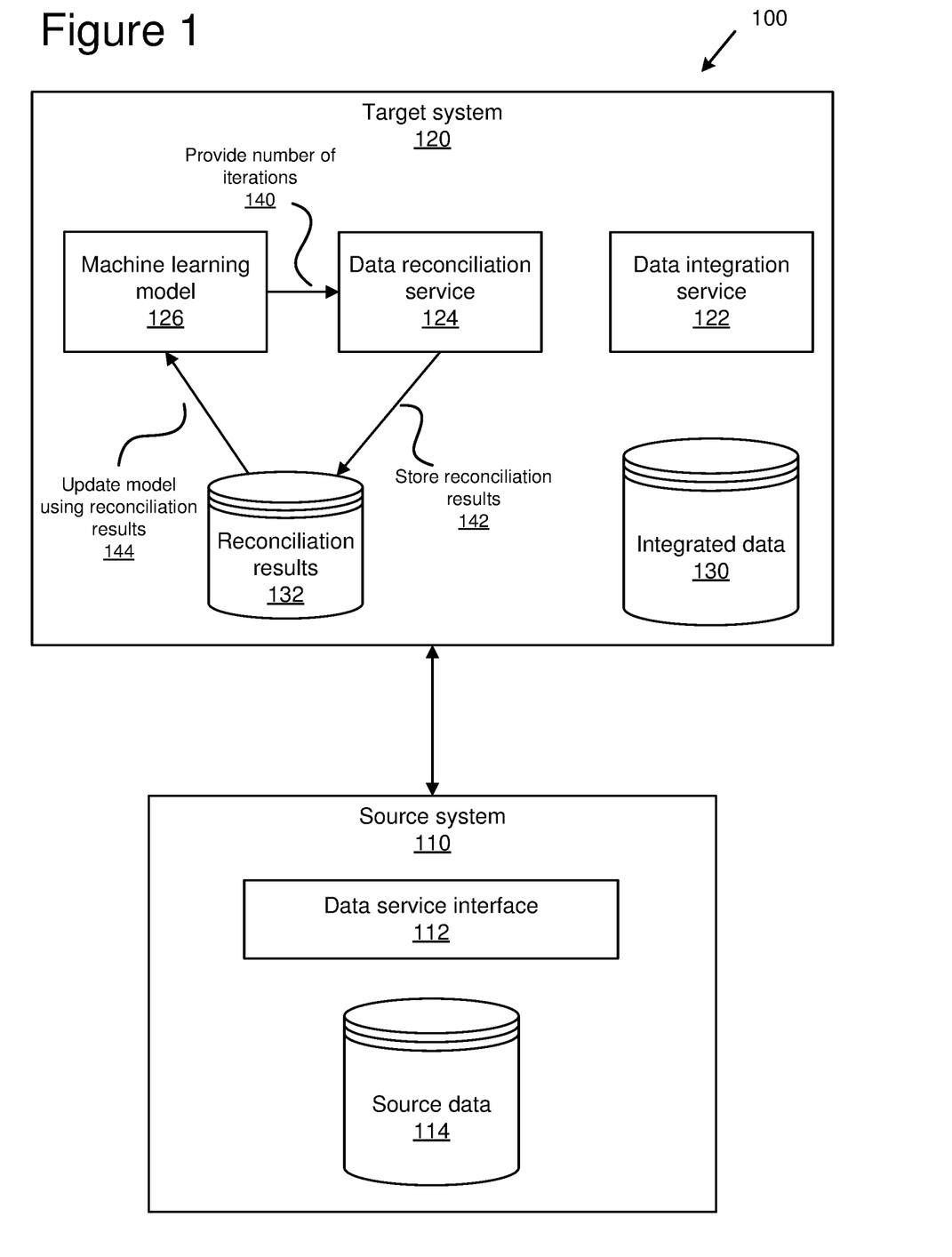
FIG. 1 is a diagram depicting an example environment for performing automated data integration, reconciliation, and/or self-healing using machine learning.

FIG. 1 is a diagram depicting an example environment 100 for performing automated data integration, reconciliation, and/or self-healing using machine learning. The example environment 100 includes a source system 110 and a target system 120. The source system 110 and the target system 120 can include various types of computing resources (e.g., software resources, server computers, database systems, cloud computing resources, networking resources, and/or other types of computing resources).

The source system 110 is a separate from the target system 120. For example, the source system 110 maintains data separately from the target system 120. The source system 110 and the target system 120 communicate via a network environment (not depicted). For example, the network environment can comprise local area networks, wide area networks, the Internet, and/or other types of networks.

The source system 110 is associated with source data 114 (e.g., a database, a table in a database, a portion of a database table, or some other type of data store or portion of a data store). The source system 110 manages access to the source data 114 via a data service interface 112. For example, the data service interface 112 can provide access to the source data 114 by external systems (e.g., by target system 120 and/or by other systems). The data service interface 112 can comprise application programming interfaces (APIs), web services, and/or other service interfaces allowing access to the source data 114.

The target system 120 is associated with integrated data 130 (e.g., stored in a database or data store). The target system 120 comprises a data integration service 122 that obtains data from other systems, integrates the obtained data (e.g., performs data transformation operations), and stores the resulting data as integrated data 130. For example, the data integration service 122 obtains source data 114 from the source system 110 via the data integration service 112, performs various processing operations (e.g., data transformations), and stores the obtained data as integrated data 130.

The goal of the data integration service 122 is to maintain the integrated data 130 as a consistent representation of the source data 114. Data consistency between the integrated data 130 and the source data 114 means that all of the source data 114 is represented in the integrated data 130. The source data 114 could be represented in the integrated data 130 in the same format or structure or in a different format or structure. In addition, an element of integrated data 130 may not include all aspects of the corresponding element of source data 114 (e.g., a database record in the integrated data 130 may not include all fields that are present in the corresponding database record in the source data 114). Data integration is different from data replication in which an exact copy of the source data is maintained at the target. For example, the data can be transformed for use at the target system and not all aspects of the data may be present in the integrated data. While the technology is described in the context of data integration, the technology can also be applied in the context of data replication.

For example, if the source data 114 contains fifty database records, and all fifty database records are represented in the integrated data 130, then the integrated data 130 is consistent with the source data 114. However, if the integrated data 130 only contains forty nine database records (i.e., one of the database records present in the source data 114 is not represented in the integrated data 130), then the integrated data 130 is not consistent (i.e., is inconsistent) with the source data 114.

The target system 120 includes a data reconciliation service 124. The data reconciliation service 124 performs reconciliation of the integrated data 130 in relation to the source data 114. For example. The data reconciliation service 124 checks whether the integrated data 130 is consistent with the source data 114 (e.g., checks whether all database records of the source data 114 are represented in the integrated data 130).

The data reconciliation service 124 performs a number of iterations of reconciliation. For example, the reconciliation service 124 receives an indication of a number of iterations from a machine learning model 126, as depicted at 140. The data reconciliation service 124 performs a number of operations for each iteration. For example, for each iteration the data reconciliation service 124 performs reconciliation of the integrated data 130 against the source data 114, and if any reconciliation errors are found, the data reconciliation service 124 performs a self-healing operation. The self-healing operation can comprise integrating data that is missing in the integrated data 130 with data from the source data 114 (e.g., integrating missing database records).

The data reconciliation service 124 also produces reconciliation results. For example, the results can comprise the number of iterations performed, the number of reconciliation errors found (e.g., the number of missing records, etc.), and/or other results. The reconciliation results can be generated as overall values and/or on a per-iteration basis. The data reconciliation service 124 can output the reconciliation results (e.g., store the results, send the results to an administrator, etc.). In some implementations, the data reconciliation service 124 stores the reconciliation results in a reconciliation results data store 132, as depicted at 142.

The machine learning model 126 dynamically determines the number of iterations that the data reconciliation service 124 will perform based at least in part on reconciliation results. For example, the machine learning model 126 updates itself (e.g., re-trains) using the reconciliation results stored in the reconciliation results data store 132, as depicted at 144.

The machine learning model 126 can be trained (e.g., re-trained) to generate a number of iterations that ensures data consistency between the integrated data 130 and the source data 114. The number of iterations provided by the machine learning model 126 is a prediction of the number of iterations that will be needed to ensure consistency of the integrated data 130. For example, the number of iterations can be generated such that the final iteration is likely to result in zero reconciliation errors. For example, if the machine learning model 126 instructs the data reconciliation service 124 to perform four iterations, and reconciliation results indicate that there are still reconciliation errors (e.g., missing database records) on the fourth iteration, then the machine learning model 126 can dynamically adjust (e.g., re-train the model) to add additional iterations (e.g., to move to five or six iterations). As another example, if the machine learning model 126 instructs the data reconciliation service 124 to perform six iterations, and reconciliation results indicate that there were no reconciliation errors on the fourth, fifth, and sixth iterations, then the machine learning model 126 can dynamically adjust (e.g., re-train the model) to reduce the number of iterations (e.g., to move from six or four iterations). In some implementations, the machine learning model 126 dynamically adjusts the number of iterations with the goal of having the last iteration result in zero reconciliation errors (e.g., with four iterations the first three may have reconciliation errors, but the fourth iteration would have none). Therefore, in such implementations, the machine learning model 126 can increase the number of iterations when the last iteration of the previous run had reconciliation errors, and reduce the number of iterations when the last two or more iterations of the previous run did not have reconciliation errors.

The machine learning model 126 can use a variety of machine learning algorithms to dynamically determine the number of iterations to perform. In some implementations, the machine learning model 126 uses a regression algorithm (e.g., a multiple linear regression model or a polynomial regression model). For example, a regression model can be prepared using gradient descent.

The machine learning model 126 can balance efficiency versus accuracy. For example, by dynamically adjusting the number of iterations, the machine learning model 126 can be trained to only indicate a number of iterations needed to ensure consistency of the integrated data. For example, if the number of iterations is dynamically adjusted so that the last iteration likely results in zero reconciliation errors, then data consistency is ensured without performing additional iterations, which is a more efficient solution (e.g., more efficient than solutions that do not dynamically adjust the number of iterations, which can result in unnecessary iterations that consume additional computing resources and/or insufficient iterations to catch reconciliation errors).

The data reconciliation service 124 can run on a periodic basis (e.g., daily, hourly, or on some other periodic basis). For example, the data reconciliation service 124 can run once a day to check the consistency of the integrated data 130. The machine learning model 126 can also dynamically adjust the number of iterations (e.g., by re-training the model) on a periodic basis (e.g., on the same periodic basis as the data reconciliation service 124 or on another periodic basis). The date reconciliation service 124 and/or the machine learning model 126 can also be initiated at other times (e.g., run manually, run automatically based on an event such as the presence of new data, and/or run at other times).

The data reconciliation service 124 can check the consistency of the integrated data 130 directly (e.g., by directly comparing the integrated data 130 against the source data 114 via the data service interface 112), indirectly (e.g., by going through the data integration service 122), or in another way.

If a reconciliation error is detected, then self-healing action can be taken. The self-healing action can be taken by the data reconciliation service 124 and/or by another component of the target system 120. Self-healing can comprise integrating missing data (e.g., integrating missing database records and/or attributes from the source data 114 to the integrated data 130). Self-healing can also comprise fixing other reconciliation errors (e.g., removing additional data, such as records or attributes, that are present in the integrated data 130 but not in the source data 114).

The source system 110 is labeled as the "source," and the target system 120 is labeled the "target" to illustrate operation of the integration, reconciliation, and/or self-healing technologies described herein. However, either system could operate as the source of data for sending to the other system for integration, reconciliation, and/or self-healing (e.g., either system could be the source and/or target). In addition, a typical environment can include multiple systems, any of which could be a source of data for sending to any other for integration, reconciliation, and/or self-healing.

Figure 2:
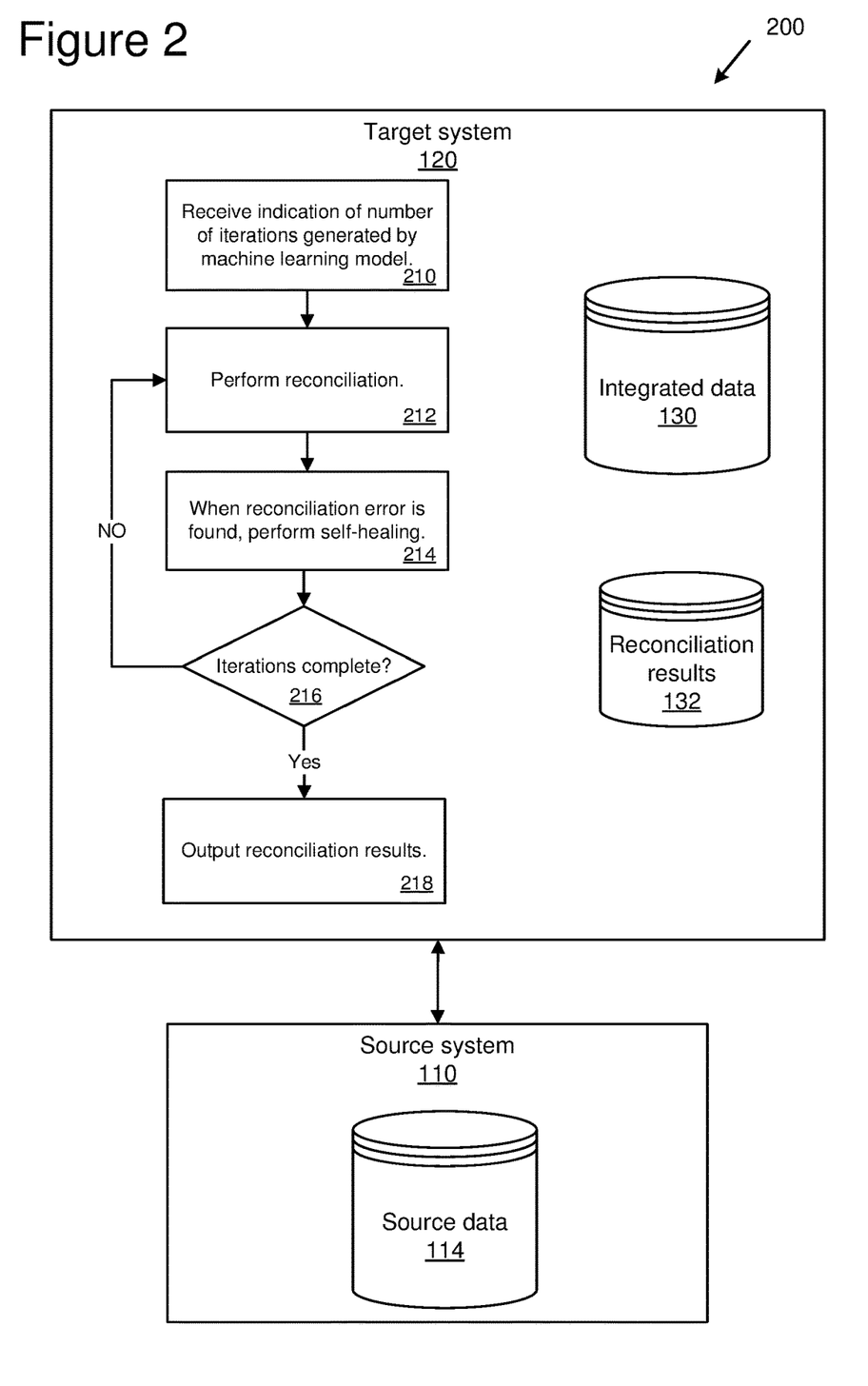
FIG. 2 is a diagram depicting an example environment and example operations for performing automated data integration, reconciliation, and/or self-healing using machine learning.

FIG. 2 is a diagram depicting an example environment and example operations 200 for performing automated data integration, reconciliation, and/or self-healing using machine learning. Specifically, a number of example operations are depicted that can be performed by the target system 120 (e.g., by the data reconciliation service 124 and/or by another component of the target system 120). The example operations are performed as part of an automated reconciliation and self-healing process.

At 210, an indication of a number of iterations is received. The indication is generated by a machine learning model (e.g. by machine learning model 126). The number of iterations can be a prediction of how many iterations will be needed to ensure that the integrated data 130 is consistent with the source data 114. For example, the indication can be a number (e.g., four, five, six, or another number that specifies the number of reconciliation iterations to perform).

A number of operations are then performed for each iteration. Specifically, for each iteration, a reconciliation operation is performed, as depicted at 212. The reconciliation operation checks the consistency of the integrated data 130 in relation to the source data 114. If any reconciliation errors are found during the reconciliation iteration, then a self-healing operation is performed, as depicted at 214. If there are more iterations to perform, then the reconciliation and self-healing process proceeds back to 212 to start the next iteration. If the iterations are complete, then the reconciliation and self-healing process proceeds to 218.

At 218, reconciliation results are output. For example, the reconciliation results can be stored in the reconciliation results data store 132.

Methods for Automated Reconciliation and Self-Healing

In the technologies described herein, methods can be provided for automated reconciliation and self-healing. For example, hardware and/or software elements can perform operations to automatically integrate data from a source system to a target system, perform a number of iterations of reconciliation and self-healing, and output results that can be used, by a machine learning model, to dynamically adjust the number of iterations for future reconciliation.

Figure 3:
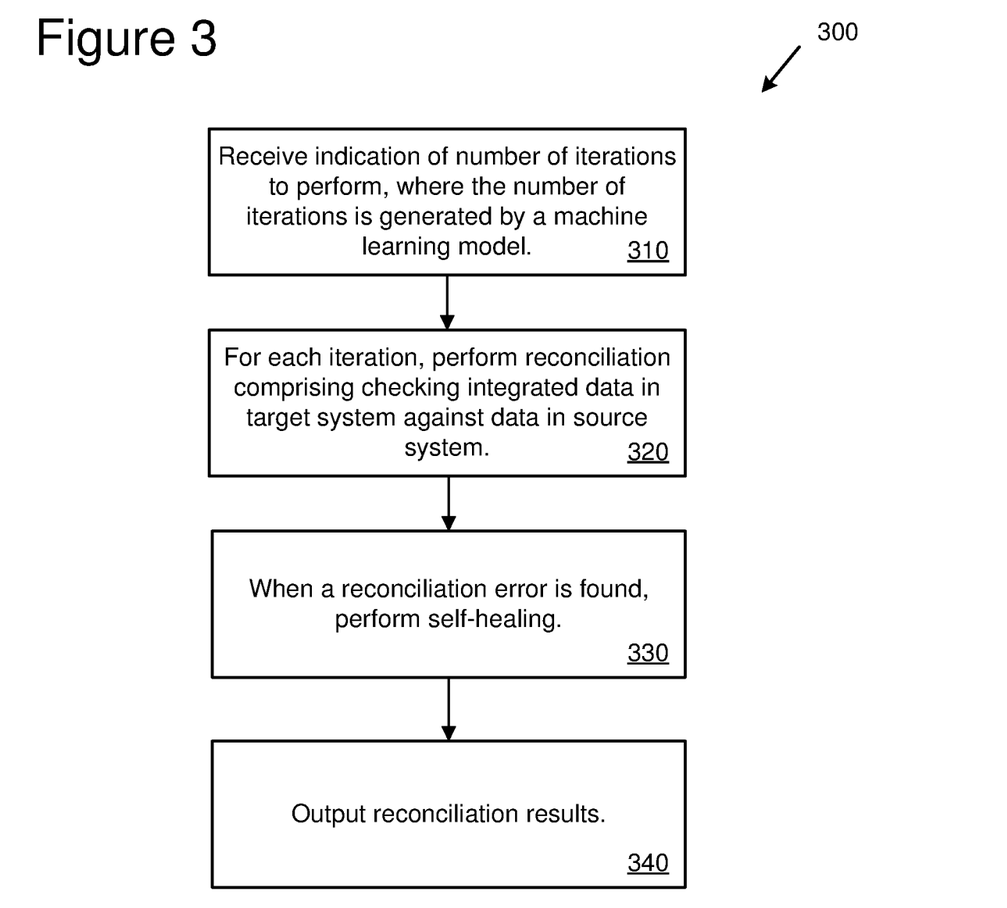
FIG. 3 is a flowchart of an example process for automated data reconciliation and self-healing using machine learning.

FIG. 3 is a flowchart depicting an example process 300 for automated data reconciliation and self-healing using machine learning. At 310, an indication of a number of reconciliation iterations to perform is received. The number of reconciliation iterations is generated by a machine learning model. For example, the machine learning model can dynamically adjust the number of reconciliation iterations based at least in part on reconciliation results.

At 320, reconciliation is performed for each iteration. Reconciliation comprises checking consistency of integrated data (e.g., in a target system) against source data (e.g., in a source system).

At 330, when a reconciliation error is found during an iteration, self-healing is performed. Self-healing is performed to correct the integrated data (e.g., to integrate missing database records).

At 340, reconciliation results are output. For example, the reconciliation results can be provided to the machine learning model to adjust the number of iterations (e.g., to re-train the model).

Figure 4:
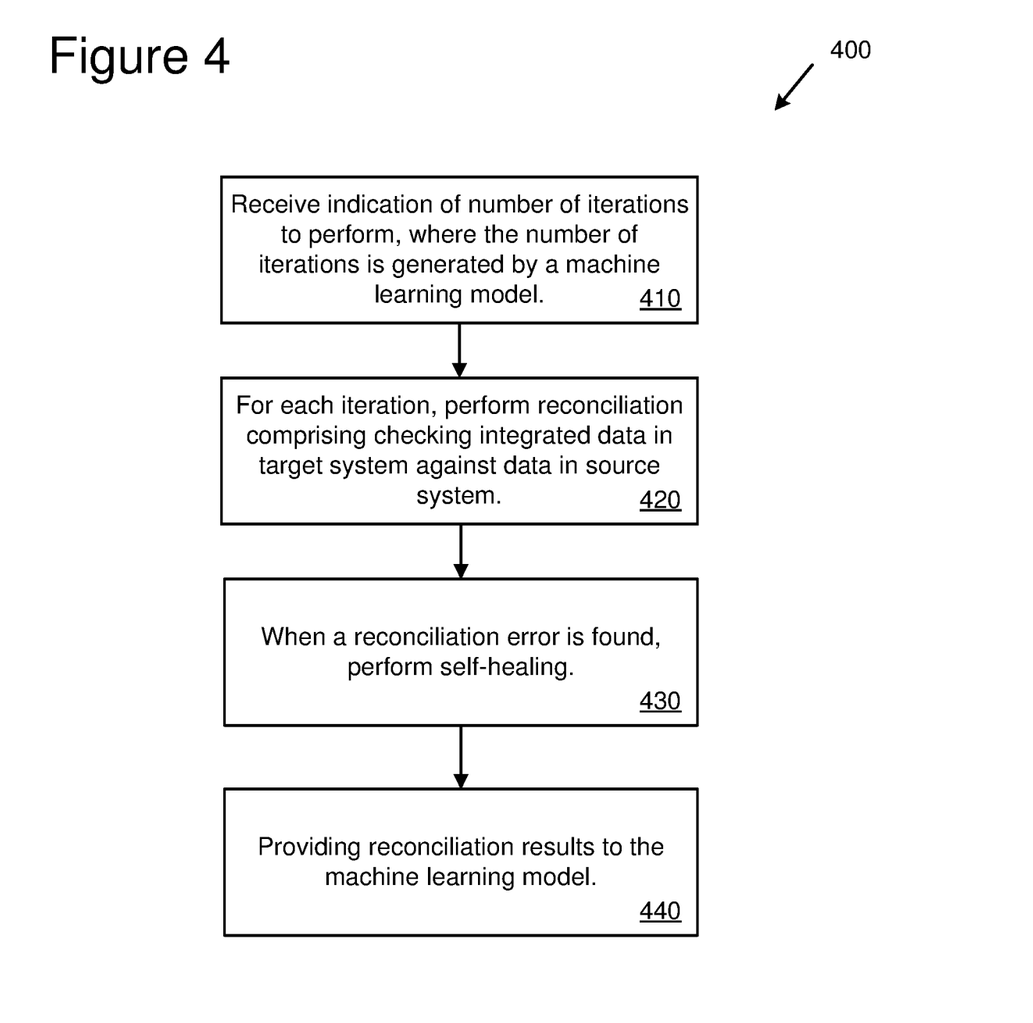
FIG. 4 is a flowchart of an example process for automated data reconciliation and self-healing using machine learning.

FIG. 4 is a flowchart depicting an example process 400 for automated data reconciliation and self-healing using machine learning. At 410, an indication of a number of reconciliation iterations to perform is received. The number of reconciliation iterations is generated by a machine learning model. For example, the machine learning model can dynamically adjust the number of reconciliation iterations based at least in part on reconciliation results.

At 420, reconciliation is performed for each iteration. Reconciliation comprises checking consistency of integrated data (e.g., in a target system) against source data (e.g., in a source system).

At 430, when a reconciliation error is found during an iteration, self-healing is performed. Self-healing is performed to correct the integrated data (e.g., to integrate missing database records).

At 440, reconciliation results are provided to the machine learning model. For example, the reconciliation results can comprise indications of the reconciliation errors that were found during the iterations and/or the self-healing action taken (performed at 420 and 430). The machine learning model can use the reconciliation results to dynamically adjust the number of reconciliation iterations to perform for future reconciliation.

Computing Systems

Figure 5:
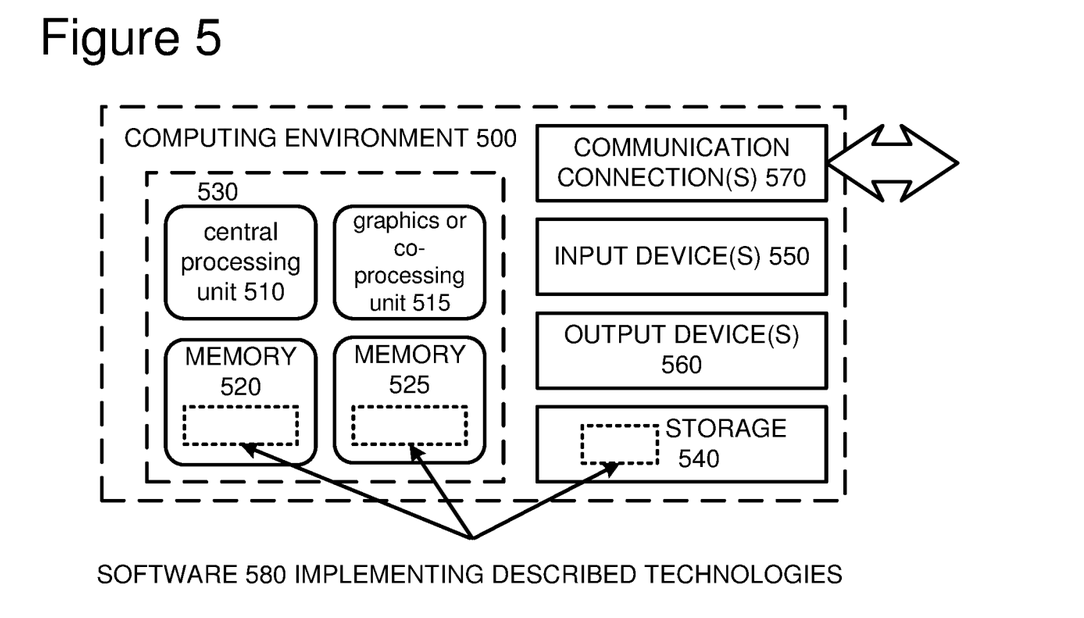
FIG. 5 is a diagram of an example computing system in which some described embodiments can be implemented.

FIG. 5 depicts a generalized example of a suitable computing system 500 in which the described innovations may be implemented. The computing system 500 is not intended to suggest any limitation as to scope of use or functionality, as the innovations may be implemented in diverse general-purpose or special-purpose computing systems.

With reference to FIG. 5, the computing system 500 includes one or more processing units 510, 515 and memory 520, 525. In FIG. 5, this basic configuration 530 is included within a dashed line. The processing units 510, 515 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 5 shows a central processing unit 510 as well as a graphics processing unit or co-processing unit 515. The tangible memory 520, 525 may be volatile memory (e.g., registers, cache, RAM), non-volatile memory (e.g., ROM, EEPROM, flash memory, etc.), or some combination of the two, accessible by the processing unit(s). The memory 520, 525 stores software 580 implementing one or more innovations described herein, in the form of computer-executable instructions suitable for execution by the processing unit(s).

A computing system may have additional features. For example, the computing system 500 includes storage 540, one or more input devices 550, one or more output devices 560, and one or more communication connections 570. An interconnection mechanism (not shown) such as a bus, controller, or network interconnects the components of the computing system 500. Typically, operating system software (not shown) provides an operating environment for other software executing in the computing system 500, and coordinates activities of the components of the computing system 500.

The tangible storage 540 may be removable or non-removable, and includes magnetic disks, magnetic tapes or cassettes, CD-ROMs, DVDs, or any other medium which can be used to store information in a non-transitory way and which can be accessed within the computing system 500. The storage 540 stores instructions for the software 580 implementing one or more innovations described herein.

The input device(s) 550 may be a touch input device such as a keyboard, mouse, pen, or trackball, a voice input device, a scanning device, or another device that provides input to the computing system 500. For video encoding, the input device(s) 550 may be a camera, video card, TV tuner card, or similar device that accepts video input in analog or digital form, or a CD-ROM or CD-RW that reads video samples into the computing system 500. The output device(s) 560 may be a display, printer, speaker, CD-writer, or another device that provides output from the computing system 500.

The communication connection(s) 570 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-executable instructions, such as those included in program modules, being executed in a computing system on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

The terms "system" and "device" are used interchangeably herein. Unless the context clearly indicates otherwise, neither term implies any limitation on a type of computing system or computing device. In general, a computing system or computing device can be local or distributed, and can include any combination of special-purpose hardware and/or general-purpose hardware with software implementing the functionality described herein.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

Cloud Computing Environment

Figure 6:
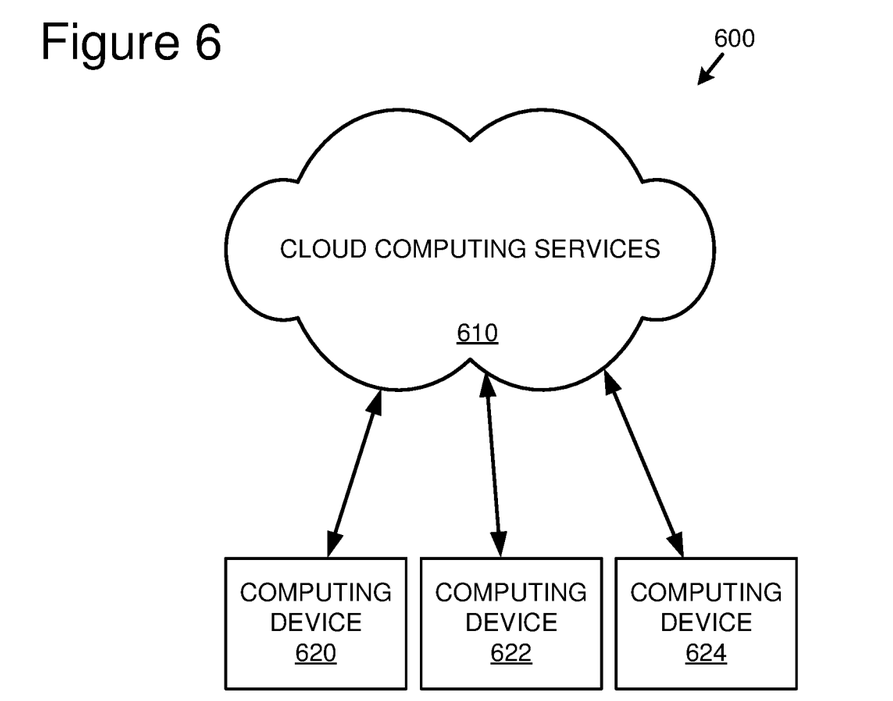
FIG. 6 is an example cloud computing environment that can be used in conjunction with the technologies described herein.

FIG. 6 depicts an example cloud computing environment 600 in which the described technologies can be implemented. The cloud computing environment 600 comprises cloud computing services 610. The cloud computing services 610 can comprise various types of cloud computing resources, such as computer servers, data storage repositories, database resources, networking resources, etc. The cloud computing services 610 can be centrally located (e.g., provided by a data center of a business or organization) or distributed (e.g., provided by various computing resources located at different locations, such as different data centers and/or located in different cities or countries).

The cloud computing services 610 are utilized by various types of computing devices (e.g., client computing devices), such as computing devices 620, 622, and 624. For example, the computing devices (e.g., 620, 622, and 624) can be computers (e.g., desktop or laptop computers), mobile devices (e.g., tablet computers or smart phones), or other types of computing devices. For example, the computing devices (e.g., 620, 622, and 624) can utilize the cloud computing services 610 to perform computing operators (e.g., data processing, data storage, and the like).

Example Implementations

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions or a computer program product stored on one or more computer-readable storage media and executed on a computing device (i.e., any available computing device, including smart phones or other mobile devices that include computing hardware). Computer-readable storage media are tangible media that can be accessed within a computing environment (one or more optical media discs such as DVD or CD, volatile memory (such as DRAM or SRAM), or nonvolatile memory (such as flash memory or hard drives)). By way of example and with reference to FIG. 5, computer-readable storage media include memory 520 and 525, and storage 540. The term computer-readable storage media does not include signals and carrier waves. In addition, the term computer-readable storage media does not include communication connections, such as 570.

Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, or any other suitable programming language. Likewise, the disclosed technology is not limited to any particular computer or type of hardware. Certain details of suitable computers and hardware are well known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and sub combinations with one another. The disclosed methods, apparatus, and systems are not limited to any specific aspect or feature or combination thereof, nor do the disclosed embodiments require that any one or more specific advantages be present or problems be solved.

The technologies from any example can be combined with the technologies described in any one or more of the other examples. In view of the many possible embodiments to which the principles of the disclosed technology may be applied, it should be recognized that the illustrated embodiments are examples of the disclosed technology and should not be taken as a limitation on the scope of the disclosed technology. Rather, the scope of the disclosed technology includes what is covered by the scope and spirit of the following claims.

What is claimed is:

1. A method, performed by one or more computing devices, for automated data reconciliation and self-healing using machine learning, the method comprising:
    receiving an indication of a number of reconciliation iterations to perform, wherein the number of reconciliation iterations is two or more, wherein the number of reconciliation iterations is generated by a machine learning model, and wherein the number of reconciliation iterations changes dynamically based on prior reconciliation results;
    for each reconciliation iteration of the number of reconciliation iterations:
        performing reconciliation comprising checking consistency of integrated data in a target system against source data in a source system; and
        when a reconciliation error is found, performing a self-healing operation to correct the integrated data in the target system; and
    outputting reconciliation results from performing the reconciliations over the number of reconciliation iterations, wherein outputting the reconciliation results comprises providing the reconciliation results to the machine learning model;
    wherein the machine learning model is retrained using the reconciliation results, and wherein the machine learning model dynamically adjusts a number of reconciliation iterations to perform for future reconciliation based on the reconciliation results, comprising increasing the number of reconciliation iterations to perform for future reconciliation when reconciliation errors are found during each reconciliation iteration; and
    wherein the machine learning model is trained to predict a number of reconciliation iterations that will be needed to ensure consistency of the integrated data in relation to the source data.

2. The method of claim 1, wherein performing the reconciliation comprises:
    determining whether there is any source data in the source system that is not represented in the integrated data in the target system.

3. The method of claim 1, wherein performing the reconciliation comprises:
    determining whether there are any database records in the source system that have not been integrated at the target system.

4. The method of claim 1, wherein performing the reconciliation comprises:
    checking for reconciliation errors comprising:
        checking for source data in the source system that is not represented at the target system; and
        checking for integrated data in the target system that is not represented at the source system.

5. The method of claim 1, wherein the target system operates in a cloud computing environment.

6. The method of claim 1, wherein the reconciliation results comprise:
    the number of reconciliation iterations performed; and
    a number of missing records found.

7. The method of claim 1, wherein the reconciliation results comprise:
    for each reconciliation iteration:
        a number of reconciliation errors found; and
        a type of each reconciliation error found.

8. One or more computing devices comprising:
    processors; and
    memory;
    the one or more computing devices configured, via computer-executable instructions, to perform operations for automated data reconciliation and self-healing using machine learning, the operations comprising:
        receiving an indication of a number of reconciliation iterations to perform, wherein the number of reconciliation iterations is two or more, wherein the number of reconciliation iterations is generated by a machine learning model, and wherein the number of reconciliation iterations changes dynamically based on prior reconciliation results;
        for each reconciliation iteration of the number of reconciliation iterations:

performing reconciliation comprising checking consistency of integrated data in a target system against source data in a source system; and when a reconciliation error is found, performing a self-healing operation to correct the integrated data in the target system; and outputting reconciliation results from performing the reconciliations over the number of reconciliation iterations, wherein outputting the reconciliation results comprises providing the reconciliation results to the machine learning model;

wherein the machine learning model is retrained using the reconciliation results, and wherein the machine learning model dynamically adjusts a number of reconciliation iterations to perform for future reconciliation based on the reconciliation results, comprising increasing the number of reconciliation iterations to perform for future reconciliation when reconciliation errors are found during each reconciliation iteration; and wherein the machine learning model is trained to predict a number of reconciliation iterations that will be needed to ensure consistency of the integrated data in relation to the source data.

9. The one or more computing devices of claim 8, wherein performing the reconciliation comprises:
determining whether there is any source data in the source system that is not represented in the integrated data in the target system.

10. The one or more computing devices of claim 8, wherein performing the reconciliation comprises:
checking database identifiers of records in the integrated data with database identifiers of corresponding records in the source data.

11. The one or more computing devices of claim 8, wherein the reconciliation results comprise:
for each reconciliation iteration:
a number of reconciliation errors found; and
a type of each reconciliation error found.

12. One or more computer-readable storage media storing computer-executable instructions for execution on one or more computing devices to perform operations for automated data reconciliation and self-healing using machine learning, the operations comprising:
receiving an indication of a number of reconciliation iterations to perform, wherein the number of reconciliation iterations is two or more, wherein the number of reconciliation iterations is generated by a machine learning model, and wherein the number of reconciliation iterations changes dynamically based on prior reconciliation results;

for each reconciliation iteration of the number of reconciliation iterations:
performing reconciliation comprising checking consistency of integrated data in a target system against source data in a source system; and
when a reconciliation error is found, performing a self-healing operation to correct the integrated data in the target system; and providing reconciliation results to the machine learning model, wherein the machine learning model is retrained using the reconciliation results, and wherein the machine learning model dynamically adjusts a number of reconciliation iterations to perform for future reconciliation based on the reconciliation results, comprising increasing the number of reconciliation iterations to perform for future reconciliation when reconciliation errors are found during each reconciliation iteration;

wherein the machine learning model is trained to predict a number of reconciliation iterations that will be needed to ensure consistency of the integrated data in relation to the source data.

13. The one or more computer-readable storage media of claim 12, wherein performing the reconciliation comprises:
determining whether there is any source data in the source system that is not represented in the integrated data in the target system.

14. The one or more computer-readable storage media of claim 12, wherein the reconciliation results comprise:
for each reconciliation iteration:
a number of reconciliation errors found; and
a type of each reconciliation error found.

* * * * *